May 22, 1923.
F. J. SIKOROVSKY
1,455,973
COMBINATION MANDREL AND GAUGE
Filed April 24, 1922
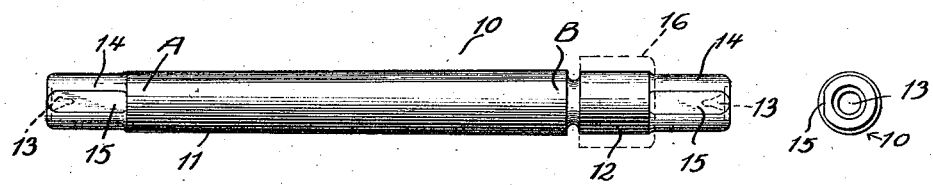
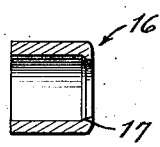
INVENTOR
FRANK J. SIKOROVSKY
By Chinoski Parker & Carlson
ATTYS.

Patented May 22, 1923.

1,455,973

UNITED STATES PATENT OFFICE.

FRANK J. SIKOROVSKY, OF CHICAGO, ILLINOIS.

COMBINATION MANDREL AND GAUGE.

Application filed April 24, 1922. Serial No. 556,301.

*To all whom it may concern:*

Be it known that I, FRANK J. SIKOROVSKY, a citizen of the United States, residing at Chicago, in the county of Cook and State of Illinois, have invented a certain new and useful Combination Mandrel and Gauge, of which the following is a specification.

This invention relates to a combination mandrel and gauge.

In machine shop practice it has been common to have as a part of the regular equipment a set of mandrels progressing by sixteenths or eights of an inch in diameter, depending upon the elaborateness of the equipment. A separate set of gauges of correspondingly progressing diameters was also kept which were used for measuring accurately the internal bores of pieces of work to be fixed on the mandrels to be machined externally. The taper of the mandrels being relatively slight, the bore of the piece of work would have to be made accurately in order to be small enough not to slip off the large end of the mandrel when driven tightly in place thereon, and still to be large enough to pass over the small end of the mandrel. Workmen, either because of the exacting policy of the shop as to production or due to individual carelessness, were frequently in the habit of guessing at accuracy and would not take the time or go to the trouble of getting a gauge. Consequently there was considerable spoilage costly from the standpoint both of labor and material. In the present invention the foregoing contingencies are avoided by providing a combination mandrel and gauge; the two being integral in one spindle the workman has the gauge handy whenever he uses the mandrel and he furthermore is enabled to gauge the work while machining the bore with considerably more facility than where the gauge is separate. This is because he is enabled to determine by interchangeably using the mandrel end of the spindle initially for gauging roughly until the bore approaches the proper size and then using the gauge end while making the further very light cuts or grinding necessary to bring the bore to the exact size desired.

A further object of the invention is to provide a combination mandrel and gauge which can be produced at a considerable saving over the cost of separate mandrels and gauges.

Other objects of the invention will better appear in the following description in which reference is made to the accompanying drawing wherein Figure 1 is a side elevation of the combination mandrel and gauge. Fig. 2 is an end view thereof looking at the gauge end, and Fig. 3 is a longitudinal section taken through the protecting cap provided for the gauge and which is indicated in dotted lines in Fig. 1.

The device comprises a spindle 10 having a mandrel portion 11 and a gauge portion 12 intermediate its ends. The spindle has a center 13 in each end to permit mounting in a lathe, the opposite ends of the spindle being reduced as at 14 and having flats 15 milled thereon to receive driving dogs in the usual well known manner. The mandrel 11 is tapered from the small end A to the large end B, the taper being very slight, in certain instances varying not over approximately .002 of an inch in a one-half inch mandrel about four inches long. Thus, the diameter of end A in the mandrel illustrated is approximately .499″ and end B is approximately .5007″. The gauge portion 12 is cylindrical and is accurately turned to a diameter of .500″ throughout. In other words, the gauge is somewhat larger than the small end of the mandrel and is somewhat smaller than the large end thereof, so that a piece of work whose bore is of the size of the gauge 12 will pass easily over the end A of the mandrel 11 but will bind intermediate the ends of the mandrel. It will, of course, be appreciated that since the variation in the diameters of the ends of the mandral is so very slight, unless the bore of the work is accurately made, it might be so large as to pass over the end B when driven in place to be turned, or in the other event it might be too small to pass over the end A. The necessity for the use of a gauge to determine accurately the precise diameter of the bore will be therefore apparent. Where the gauge was provided separate from the mandrel, the unhandiness or inconvenience of using it frequently led to the workman's guessing at the size of the bore of the work which he intended to fix on the mandrel to turn down externally. As a result, it frequently occurred that the workman could not by eye gauge the opening accurately enough so that the bore would be made too large to permit fixing the work upon the mandrel. It would therefore be cast aside as spoilage. This conceivably was a rather costly procedure and considerably reduced the efficiency of the shop.

In using the device of the present invention a workman will, for example, where he is making a bushing, machine the bore approximately to the size desired. Having his mandrel handy, the workman will at intervals test for size with the small end A of the mandrel. When he has approached the point where it will just fit nicely in the bore, the workman will then proceed cautiously to make a very fine cut, or in the event that is desired, he will use a grinder to enlarge the diameter very slightly up to a point where he can just fit the gauge end of the spindle in the bore. He is then certain that the bushing when driven on the mandrel will not slip over the large end B thereof. As a result of the use of this device a considerable saving in material with a consequent decrease in the cost of production is thereby effected. There is, furthermore, not the likelihood of a loss of the gauge which might chance where a separate set of gauges is kept and the workman takes out one gauge for a particular job and might forget to replace the gauge when finished with the job. In any event the gauge is apt to become injured by being laid down among cutting tools or the like on the work bench. With the latter contingency in mind I prefer to provide in the device of my invention a protecting cap 16 which preferably is of fibre or other suitable material and has a snug fit on the gauge so as not to come off unless removed intentionally. The cap, as shown, has a reduced neck portion 17 fitting over the reduced end 14 of the spindle in abutment with the shoulder provided by the gauge. The cap 16 may be of a diameter such that when in position on the gauge the forward edge of the cap is approximately in line with the edge of the remote end of the spindle so that when the device is laid on a work bench or on any other flat surface the small end of the tapered mandrel portion will lie clear of the surface. In this way there is little likelihood of the mandrel and particularly the gauge being injured and rendered inaccurate.

I have found that aside from the foregoing advantage arising from the combination mandrel and gauge it may furthermore be made at a considerable saving over the aggregate cost of separate mandrels and gauges, the labor and material in producing the unitary device costing in fact approximately only eighteen per cent more than the cost involved in the production of the mandrel alone.

I claim as my invention:

1. A device of the character described comprising the combination in a spindle of a tapered mandrel portion intermediate the ends of said spindle adapted to have work fixed thereon for turning, and a cylindrical gauge portion adjacent the large end of said tapered mandrel portion, said gauge being of a diameter larger than the small end of said tapered mandrel portion but smaller than the large end thereof 2. A device of the character described comprising the combination in a spindle of a taper mandrel intermediate the ends of said spindle adapted to have work fixed thereon for turning, said spindle being formed to provide a gauge at the end remote from the small end of said taper mandrel, said gauge and the small end of said mandrel being adapted for gauging the size of bores of work to be fixed on said mandrel, said gauge being for fine gauging and the small end of said mandrel being for rough gauging preliminary to the use of said gauge.

3. A device of the character described comprising the combination of a spindle having centers in the ends thereof for mounting between lathe centers and having the ends reduced and formed to receive driving dogs of a mandrel portion intermediate the ends of said spindle, said mandrel portion being larger than said reduced ends and being adapted to have work fixed thereon for turning, a gauge portion likewise larger than said reduced ends of said spindle and disposed adjacent one of said ends for gauging diameters within the limits of said mandrel, and a removable protecting cap to fit over said gauge.

In testimony whereof, I have hereunto affixed my signature.

FRANK J. SIKOROVSKY.